UNITED STATES PATENT OFFICE.

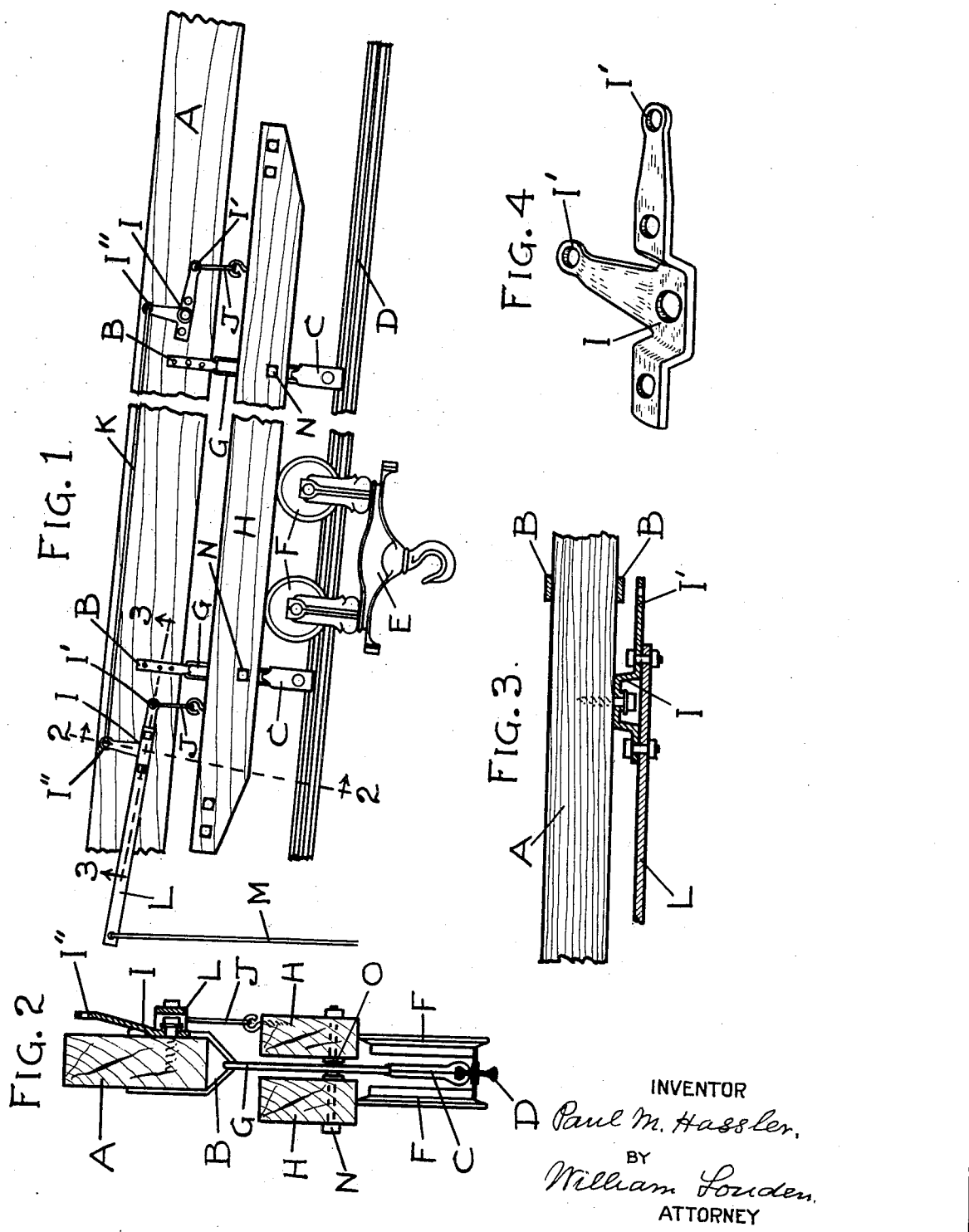

PAUL M. HASSLER, OF FAIRFIELD, IOWA, ASSIGNOR TO THE LOUDEN MACHINERY COMPANY, OF FAIRFIELD, IOWA, A CORPORATION OF IOWA.

BRAKE FOR OVERHEAD CARRIERS.

1,386,496.     Specification of Letters Patent.     Patented Aug. 2, 1921.

Application filed May 10, 1920. Serial No. 380,233.

*To all whom it may concern:*

Be it known that I, PAUL M. HASSLER, a citizen of the United States, residing at Fairfield, in the county of Jefferson and State of Iowa, have invented a new and useful Improvement in Brakes for Overhead Carriers, of which the following is a specification.

My invention relates to brakes designed to slow down the movement of overhead carriers running on a downwardly inclined track, and it consists of means applied to the connections of the track to come in contact with the wheels or other parts of the carrier at the proper place on the track and by friction thereon to gradually slow down its movement. Also, of means to release the brake and of other features hereinafter described and more fully specified in the claims.

In the accompanying drawing forming a part of this specification, Figure 1 is a side elevation of an overhead track with its connections, embodying my invention, and a carrier mounted thereon. Fig. 2 is an enlarged transverse section on line 2—2 of Fig. 1 looking in the direction of the arrow. Fig. 3 is a horizontal section on line 3—3 of Fig. 1. Fig. 4 is a detail view.

Referring to the drawing, A represents an overhead timber to which brackets B and track-hangers C are connected to support an overhead track D. Also, showing a carrier E with wheels F mounted on the track. The track-hangers C are preferably provided with links G, and on each side of these links a timber H is placed. The timbers are spaced apart so they will readily slide up and down on the links G and will normally rest by gravity on the thickened portions of the hangers C, the lower edges of which timbers will stand below the upper edges of the wheels F.

As will be seen, the lower edges of the ends of the timbers H are beveled so that when they are in their lowest position their ends will be above the upper edges of the wheels F, whereby the carrier running along the track will pass under the ends of the timbers H until their central portions will rest by gravity upon the wheels. The friction of the timbers H on the periphery of the wheels will then arrest the movement of the carrier on the track.

To release the friction from the wheels so that the carrier may be readily moved along the track, I pivot members I on the timber A, and to the outstanding ends I' of these members I connect one of the timbers H by means of wires or cords J. To one of these pivoted members I attach a lever L, by bolts as shown or otherwise, so that by pulling down on the free end of the lever the timber H will be lifted and its pressure on the carrier wheels will be removed.

A lever may be applied to both of the members I but it is preferable to apply the lever to one of the members only, and then connect them together by a wire or cord K to upstanding portions I'' on the members I. By this means, pulling down on the end of the lever will simultaneously move both members I and lift both ends of the timbers H, and will completely remove the pressure on the wheels F. Should the lever L be located above the reach of the operator a cord M may be attached to it so as to come within his reach.

Instead of the timbers H coming in contact with the carrier wheels F the frame of the carrier may be extended upward sufficiently to come in contact with the timbers, as will be readily understood, and thus secure the friction necessary to arrest the movement of the carrier. Usually the wheels of the carrier are the most upwardly extended and when this is the case it is preferable to have the timbers come in contact with the wheels as shown in the drawings. The members I are preferably dished in their centers where they are pivoted to the timber H so that their ends will stand a distance from the timber and the lever L may be freely moved without rubbing against the timber.

To prevent the timbers from being carried along the track by the movement of the carrier the bolts N which hold the timbers together may be passed through the adjacent links of the hangers. If other styles of hangers should be used the bolts N should be passed through the timber so that they cannot slide past the hangers and thus prevent the timbers from being carried along the track by the movement of the carrier. It is also advisable that a spool or thimble O should be set between the timbers to hold them the proper distance apart and that the bolts N should be passed through these spools or thimbles.

It is preferable to use a pair of timbers spaced apart on opposite sides of the track-hangers, as shown, but it is evident that a single timber flexibly connected to the track-hangers, so it will come in contact with one side of the carrier and produce the necessary friction to arrest its movement, may be used without departing from the spirit of my invention.

What I claim is:

1. In brakes for carriers running on an overhead track, a timber flexibly located in a position above and approximately parallel with the track, and adapted to come in contact by gravity with the wheels of the carrier to arrest its movement on the track.

2. In brakes for carriers running on an overhead track, a pair of timbers spaced apart and flexibly located above and parallel with the track, and adapted to come in contact by gravity with the wheels of the carrier to arrest its movement on the track.

3. In brakes for carriers running on an overhead track, hangers to support the track, a pair of timbers spaced apart and flexibly located on opposite sides of the hangers above and parallel with the track, and adapted to come in contact with the periphery of the wheels of the carrier to arrest its movement on the track.

4. In a device of the character described, a series of track-hangers secured to an overhead timber and supporting an overhead track, a carrier to run on the track, and a pair of timbers spaced apart and loosely located on opposite sides of the hangers, said timbers being adapted to come in contact with the carrier and slow down its movement on the track.

5. In a device of the character described, a series of track-hangers secured to an overhead timber and supporting an overhead track, a carrier having wheels to run on the track, and a pair of timbers spaced apart and loosely located on opposite sides of the hangers, said timbers being adapted to come in contact with the wheels of the carrier and slow down its movement on the track.

6. In a device of the character described, a series of track-hangers having links secured to an overhead timber and supporting an overhead track, a carrier adapted to run on the track, and a pair of timbers spaced apart on opposite sides of the hangers and connected together by bolts passed through the links of the hangers, said timbers being free to drop downward and come in contact with the carrier passing under them and to slow down the movement of the carrier on the track.

7. In a device of the character described, an overhead track, a series of hangers to support the track, a carrier to run on the track, a pair of timbers spaced apart on each side of the hangers above the track, thimbles inserted between the timbers in proximity to the hangers, and bolts passed through the timbers and thimbles, the timbers being located approximately parallel with the track and adapted to slide down on the hanger and come in contact with the carrier and arrest its movement on the track.

8. In a device of the character described, an overhead track, a series of hangers to support the track, a carrier to run on the track, a timber located adjacent to the hangers and adapted to be moved up and to slide down on the hangers and to come in contact with the carrier and arrest its movement on the track, and means to lift the timber and release its contact with the carrier.

9. In a device of the character described, a series of hangers connected to a fixed overhead timber and supporting an overhead track, a carrier to run on the track, a movable timber supported adjacent to the hangers and adapted to slidably come in contact with the carrier and arrest its movement on the track, and a member pivoted to the fixed overhead timber, said member being connected to and adapted to lift the movable timber and release it from contact with the carrier.

10. In a device of the character described, a series of hangers connected to a fixed overhead timber and supporting an overhead track, a carrier to run on the track, a movable timber supported adjacent to the hangers and adapted to slidably come in contact with the carrier and arrest its movement on the track, a member pivoted to the fixed overhead timber, said member being connected to the movable timber, and a lever to rotate the member and lift the movable timber from contact with the carrier.

11. In a device of the character described, a series of hangers connected to a fixed overhead timber and supporting an overhead track, a carrier to run on the track, a movable timber supported adjacent to the hangers and adapted to slidably come in contact with the carrier and arrest its movement on the track, a member having a dished center pivoted to the fixed overhead timber and outstanding arms connected to the movable timber and a lever to rotate the member and lift the movable timber from contact with the carrier.

12. In a device of the character described, a series of hangers connected to a fixed overhead timber and supporting an overhead track, a carrier to run on the track, a movable timber supported adjacent to the hangers and adapted to slidably come in contact with the carrier and arrest its movement on the track, a pair of members pivoted to the fixed overhead timber, and each member having a pair of outstanding arms, one of the arms of each member being connected to the movable timber near its ends, and the other arms of the members being connected together to move in unison, and a lever connected to one of the members to rotate it and the other connected member, and simultaneously release the ends as well as the body of the movable timber from contact with the carrier.

Fairfield, Iowa, May 6th, 1920.

PAUL M. HASSLER.